United States Patent [19]
Rüede

[11] 3,963,032
[45] June 15, 1976

[54] THRESHING MACHINE

[75] Inventor: Ernst Rüede, Bietingen, Germany

[73] Assignee: Maschinenfabrik Fahr Aktiengesellschaft, Gottmadingen, Germany

[22] Filed: Apr. 21, 1975

[21] Appl. No.: 569,710

[30] Foreign Application Priority Data
Apr. 22, 1974   Germany............................ 2419268

[52] U.S. Cl. ................................. 130/27 E; 130/24
[51] Int. Cl.² ........................................... A01F 12/00
[58] Field of Search.................. 130/21, 22 R, 22 A, 130/23, 24, 25, 26, 27 AA, 27 AB, 27 AC, 27 AD, 27 R, 27 G, 27 H, 27 HF, 27 HA, 27 J, 27 K, 27 L, 27 P, 27 Q; 56/14.5, 14.6; 209/26

[56] References Cited
UNITED STATES PATENTS

| 429,418 | 6/1890 | Butler | 130/24 |
| 546,372 | 9/1895 | Wilson | 130/24 |
| 773,530 | 10/1904 | Sheasley | 130/5 G |
| 785,508 | 3/1905 | Mason | 209/26 |

FOREIGN PATENTS OR APPLICATIONS 1,130,639   5/1962   Germany........................... 130/27 P Primary Examiner—Russell R. Kinsey
Attorney, Agent, or Firm—Karl F. Ross; Herbert Dubno

[57] ABSTRACT

A harvester thresher has two sectional rollers, one between a straw-guiding drum and a set of vibrating straw racks, the other between a conveying platform and a sifter, to improve the separation of straw and grain. Each sectional roller consists of a plurality of polygonal plates, with corners offset by an angle in peripheral direction, vertically arranged and spaced apart on a rotating axle.

9 Claims, 4 Drawing Figures

THRESHING MACHINE

FIELD OF THE INVENTION

The present invention relates to a grain-separation device for threshers, particularly in harvester (mower) threshers, for improved separation of straw and grain.

BACKGROUND OF THE INVENTION

In conventional harvester threshers a straw shaker (vibrating rack) is installed downstream of a threshing device. The mixture of straw and grain arriving from the threshing device is guided by a straw-feed drum onto the shaker. While the straw is transported to the rear, the grain gravitates through the sieve racks of the shaker down onto the sifter. The known shakers have the disadvantage, that the separation effect sharply decreases with larger amounts of straw. This leads to a relatively high loss of grain. The mentioned disadvantages also appear if the load of the shaker is unevenly distributed while working on a slope.

It is known, through U.S. Pat. Ser. No. 513,089, to install a rotating muliple-disk roller close to the straw outlet of the threshing drum, in order to achieve an improvement of the grain separation. The disk roller rotates in the same sense as the threshing drum. The underside of the roller is installed at approximately the same level as the straw outlet of the threshing drum. While the flow of straw emerging from the threshing drum is deflected by the roller downwards onto the straw shaker, the momentum of the grain enables it to maintain its direction and pass through disks of the roller. The grain separated from the straw by this method was collected and conveyed by a device installed behind the mutliple disk roll.

A disadvantage of this arrangement is that the straw thrown downwards onto the shaker by the roller becomes packed. A further disadvantage is the necessary installation and operation of additional conveying devices to feed the separated grain back onto the sifter. The space conditions too are unfavorably affected by the collecting and conveying installation situated above the shaker. Through these additional conveying and driving units the susceptibility of the machine to trouble is highly increased. The expenditure for the construction as described above is considerable.

OBJECTS OF THE INVENTION

It is the principal object of the present invention to provide an improved grain-separation device in harvester threshers in which the aforementioned disadvantages can be obviated and which provides improved results in the handling of crop materials.

It is a more specific object of the invention to provide a device which improves the separation of grain and straw.

It is another object of the invention to provide an apparatus for the purposes described, which is of simple and unexpensive construction, avoids breakdown and yet functions more effectively than the known devices for similar purposes.

SUMMARY OF THE INVENTION

These objects and others which will become apparent hereinafter, are attained in accordance with the present invention, by providing in a harvester thresher a multiple disk roller at the outlet of the straw feed drum and rotating in the opposite direction of rotation of the straw feed drum.

The roller is so disposed as to cause the flow of material to strike the lower part of said roller and sharply slow down, and thereby increasing the separation of grain from straw.

To also improve the separation of grain and straw on the shaker, the muliple-disk roller is installed between the straw guiding drum and the shaker.

For the grain to pass through the multiple-disk roller and fall down onto a conveying platform beneath the roller, the latter comprises a plurality of axially spaced disks on a common axle. The disk spacing is preferably about 20 to 60 mm.

A good conveying effect of the sectional roller is achieved if the disks are plates with triangular or square peripheral configurations and the corners of two adjacent disks are angularly offset by 60° or 45° in pheripheral direction about their common axis.

Preferably the plates are made from tin-plated iron or other nonferrous materials with a maximum thickness of about 3 mm.

The advantages achieved with the present invention by installing the sectional roller directly behind the straw guiding drum are that the separated grain is directly caught by the conveying platform. The present invention renders expensive grain feed-back devices such as worm conveyors and elevators unnecessary; the present invention also improves the separation by the roller as well as by the shaker. An additional improvement of grain separation or preselection of light and heavy parts is achieved in the area of the sifter of the harvester thresher, if the roller, according to the present invention, is installed in the transitory region between conveying platform and sifters. The packed grain and straw parts carried by the conveying platform are loosened up and separated by the present invention. The rotating axle of the multiple-disk roller is preferably installed at the same level as the rear end of the conveying platform. In order to convey the coarse material overhead and backwards the roller rotates in clockwise direction.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
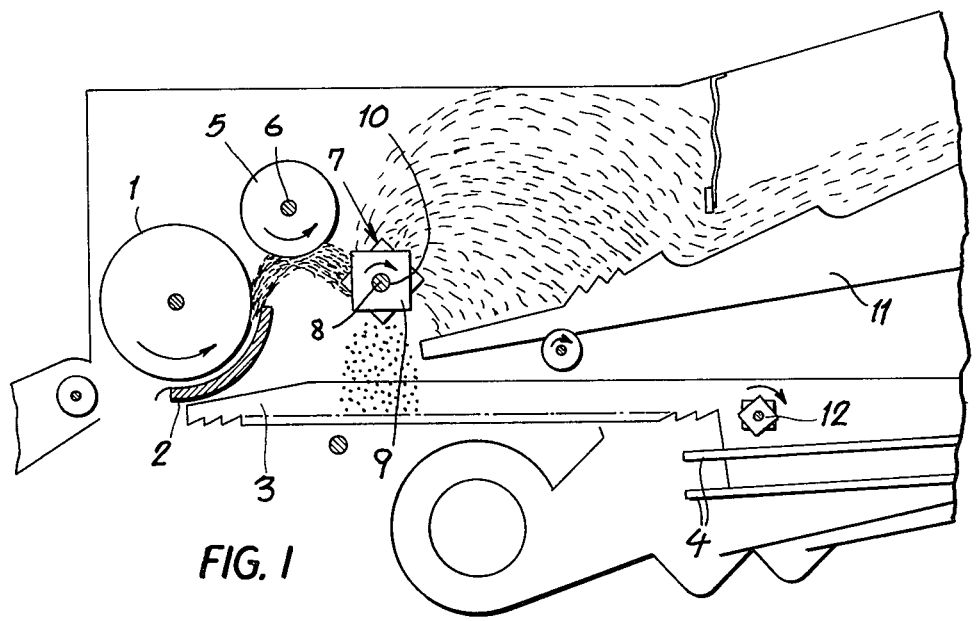
FIG. 1 is a diagrammatic longitudinal sectional view of the grain-separating device for a harvester thresher.
Figure 2:
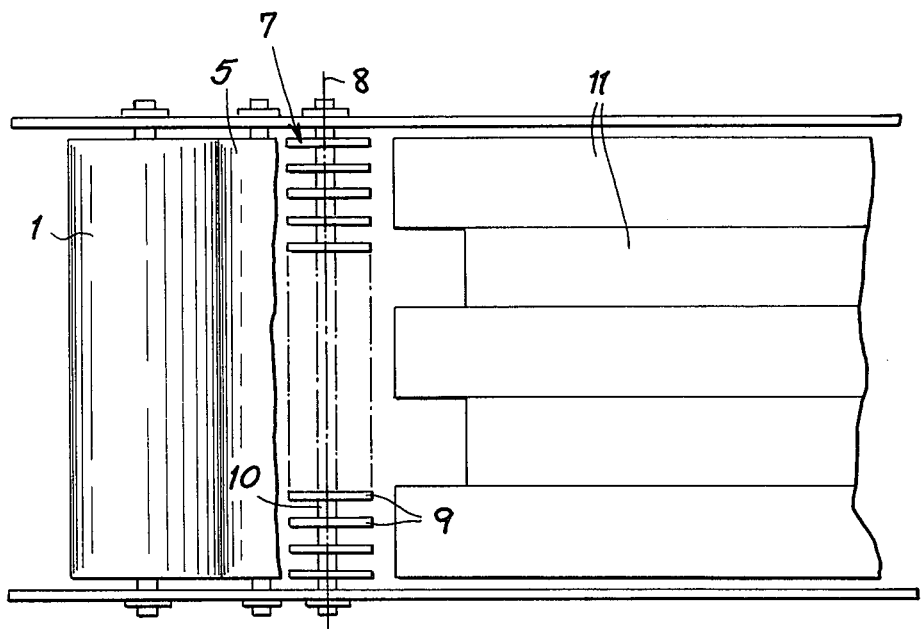
FIG. 2 is a diagrammatical plan view of the train-separating device for a harvester thresher, as shown in FIG. 1.

The schematic representation of FIG. 1 shows a threshing drum 1 together with a threshing concave 2 as parts of a harvester thresher. A conveyor platform 3 is situated below the threshing concave 2, and extends to the area of a sifting or screening installation 4. Threshing drum 1 links up with a straw-guiding drum 5, its axle 6 being parallel to and turning in the same direction as the axle of threshing drum 1. Behind and slightly below straw-guiding drum 5 a sectional roller 7 is provided which rotates counterclockwise around its axle 8, which is parallel to the axle of threshing drum 1 and the straw-guiding drum 5.

Figure 3:
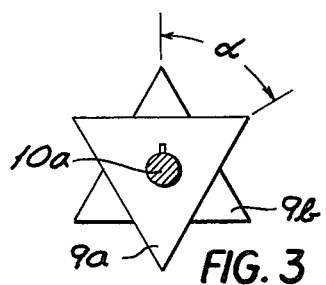
FIGS. 3 and 4 are detail views of a modification.

Roller 7 and straw-guiding drum 5 are spaced apart to create a tilted, upwardly pointing ejection slot. Roller 7 comprises a plurality of plates 9 permanently fixed to a shaft 10. In the embodiment shown in FIG. 1, the roller has plates which are fixed to shaft 10 at distances of 20 to 60 mm, with the corners of two adjacent plates offset by 45° in peripheral direction. Triangular plates 9a, 9b, with their corners offset by $\alpha = 60°$, can also be used (see FIGS. 3 and 4). Furthermore, polygonal or ragged disks can be used.

Figure 4:
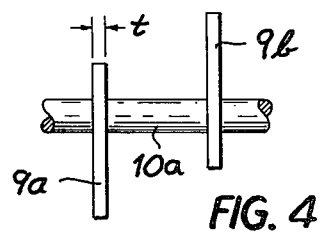

A shaker 11 (vibrating straw rack) of known type is positioned close to roller 7. The well known shaker can be replaced by rotating axial cutters or other devices which convey the straw to the rear and at the same time take over the function of a separator for the remaining grain. As shown in FIG. 4, the plates 9a and 9b can have thicknesses $t \leq 3$ mm and spacing S between 20 and 60 mm.

The straw, forced downward by the straw-guiding drum 5, strikes roller 7 and is thrown overhead by the latter onto shaker 11. The moment the straw hits roller 7 the flow of the stream is sharply slowed down. The grains keep their kinetic energy and fall between the single plates 9 of roller 7 onto conveyor platform 3, the latter being directly subjacent roller 7. The straw on the other hand is seized by the corners of plates 9 and is placed loosely onto shaker 11, which favors the separation of remaining grain by vibrating movements of the shaker. The main part of the grain still left in the straw falls down through the vibrating racks onto the conveying platform 3. The grain, the chaff and short pieces of straw falling onto the conveying platform 3, either from threshing drum 1, roller 7 or shaker 11 are carried to the rear by the vibrating movements of the conveying platform 3 onto a sifter device.

The vibrating impacts of conveying platform 3 cause packing of the chaff-short straw mixture. To achieve an effective screening the packing of material on the conveying platform 3 is loosened with a second sectional roller 12, located in the transition region between conveying platform 3 and sifter 4. Roller 12 with its axle at about the same height as the rear end of the conveying platform 3 rotates in a clockwise direction.

The chaff-short straw carpet arriving by the conveying platform 3 is lifted and torn apart by the roller 12, while the grains, because of their weight, remain on the conveying platform 3. The material seized by roller 12 is thrown onto the sifters 4 in an overhead backward movement.

With this the separation of the grain-chaff-mixture by means of an air flow is improved and the loss of grain in the sifting area is highly reduced.

The present invention is not confined to the exemplified embodiment which uses two sectional rollers 7 and 12. The installation of only one roller is possible, either using roller 7 adjacent to straw-guiding drum 5 or roller 12 in the area of sifter 4.

I claim:

1. In a harvesting-type threshing machine in combination:
   a support structure;
   a threshing drum rotatable on said support structure about a horizontal axis in one sense for receiving crop material and dislodging grain from a chaff containing straw of the crop material and feeding the mixture of straw and grain in a stream;
   a straw-deflecting drum rotated on said structure rearwardly of said threshing drum and above the axis thereof about a further horizontal axis in said sense, said straw-deflecting drum being disposed in the path of said stream for deflecting said stream in rearward direction relative to the direction of displacement of the machine;
   a multiple-disk roller rotated about a respective horizontal axis and disposed rearwardly of said straw-deflecting drum below the axis thereof for intercepting the stream of material deflected thereby for separating straw from grain, said roller being rotated in a sense opposite the sense of rotation of said drum; and
   a straw shaker rearwardly of said roller and receiving straw cast thereon by said roller.

2. The combination defined in claim 1 wherein said multiple-disk roller comprises a horizontally extending shaft and a plurality of axially spaced disks mounted on said shaft and enabling said grain to pass between said disks, said combination further comprising means below said roller for collecting said grain.

3. The combination defined in claim 2 wherein each of said disks is spaced about 20 to 60 mm from a neighboring disk on said shaft.

4. The combination defined in claim 3 wherein said disks are polygonal plates and successive plates along said shaft have corners angularly offset about the axis of said shaft.

5. The combination defined in claim 4 wherein said plates are square and successive disks having their corners mutually angularly offset by 90°.

6. The combination defined in claim 4 wherein said plates are triangular and successive plates have their corners angularly offset by 60°.

7. The combination defined in claim 4 wherein said plates are composed of sheet metal and have a thickness up to about 3 mm.

8. The combination defined in claim 4 further comprising a sieve device disposed rearwardly of said collecting means and receiving said grain therefrom, and a further multiple-disk roller disposed at the transition between said collecting means and said sieve device.

9. The combination defined in claim 8 wherein said further mutiple-disk roller has its axis substantially at the level of the collecting surface of said collecting means and is rotated in the clockwise sense and the same sense of rotation as the first mentioned roller.

* * * * *